Feb. 18, 1969   W. A. KULSON   3,427,761
RADIALLY MOVABLE LIVE CENTER WORK SUPPORT
Filed March 20, 1967
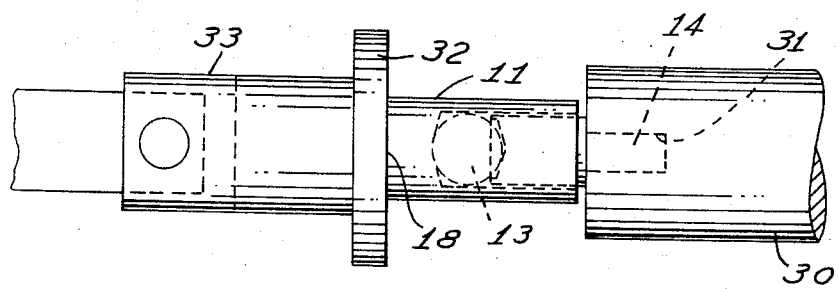
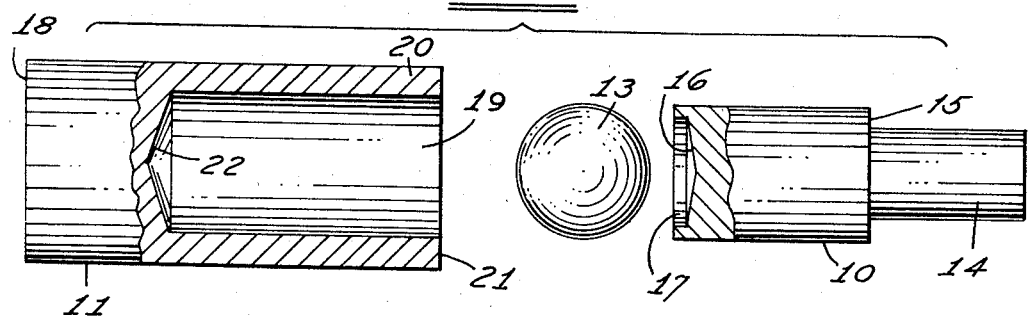
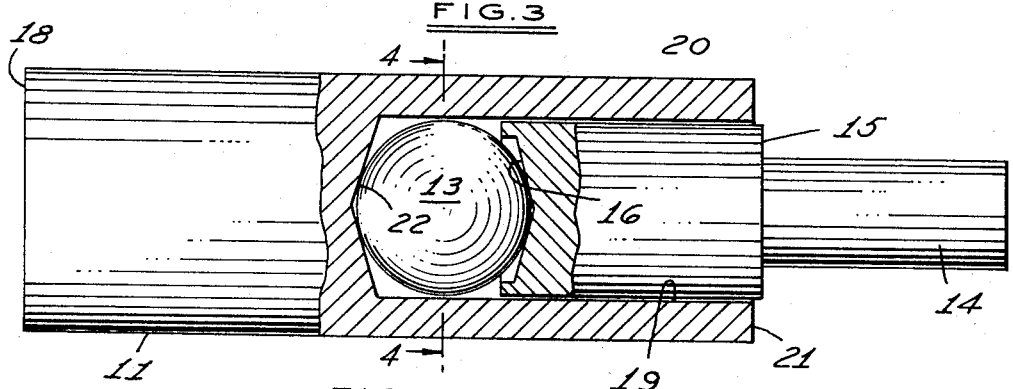
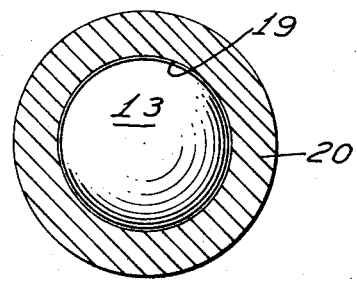
INVENTOR
WALTER A. KULSON
BY
ATTORNEY United States Patent Office 3,427,761
Patented Feb. 18, 1969

3,427,761
RADIALLY MOVABLE LIVE CENTER
WORK SUPPORT
Walter A. Kulson, 30034 Paul Court,
Warren, Mich. 48092
Filed Mar. 20, 1967, Ser. No. 624,344
U.S. Cl. 51—237                                    1 Claim
Int. Cl. B24b 5/00, 41/06; B23b 5/22

ABSTRACT OF THE DISCLOSURE

A rotary workholder for holding a workpiece between a machine headstock and tailstock including a live center on the tailstock having a ball and opposed conical faces engaging the ball to permit slight radial shifting of the work to prevent stress in the work due to misalignment.

This invention relates to live center devices for holding workpieces and particularly to such a device which is capable of moving slightly with a workpiece such as radially and/or eccentrically.

Most, if not all, "centering" devices have for their prime design the purpose of holding a workpiece on axial center. The instant device is also capable of locating a workpiece axial center but it is capable of allowing movement of the workpiece off axial center also.

It has been found that when a workpiece is mounted between two rigidly mounted machine elements, that any axial difference between them must be absorbed by the workpiece. This puts the workpiece in the position of being an absorber of differences and this prevents extreme accuracy in the machining or grinding of the workpiece.

It has also been found that if an intermediate member is located at one machine element adjacent the workpiece as the absorber of any differences, that the control of the workpiece is taken over by the other machine element and without interference resulting in the achievement of extreme accuracy.

This may be referred to as the tendency of a workpiece to "walk" between rigid members. This tendency is substantially reduced when the rigidity of one of the members is removed from influence on the workpiece.

It is therefore an object of the invention to reduce if not eliminate the tendency of the workpiece to walk between rigidly opposed members thereby increasing accurate control of the workpiece by one of the members.

An object of the invention is to provide a live center which is slightly radially or angularly movable with a workpiece to substantially eliminate the live center as a rigid workpiece laterally positioning member so as to allow the opposing member, such as the head stock of the machine or drive member, to control the workpiece without opposition so that the workpiece may be accurately controlled by the opposing member.

An object of the invention is to provide a device having a stub shaft with mounting means such as a stem, so that the stub shaft may be mounted on a machine such as in the tail stock of a machine.

An object of the invention is to provide an axial bearing face on the stub shaft having a conical conformation on converging intersecting lines which are tangent to a sphere at a large angle to one another such as 155°–175° so that when contacted by a spherical or ball bearing, the bearing surface contacts the ball bearing closely adjacent to but off the axial center of the bearing so as to eliminate point contact and to also eliminate socketing contact to permit the ball to move slightly radially relative to the bearing surface.

An object of the invention is to provide a cylindrical head having an outer workpiece engaging end and an opposite inner end with an internal bore leading through the inner end to a point internally of the head intermediate the ends and wherein the axial bore terminates in an internal end wall having a conical bearing face internally of the head substantially like or identical to the axial bearing face of the stub shaft.

An object of the invention is to provide a radial sleeve bearing on the head formed by the internal bore so that the head is slipped over the stub shaft in relatively loose sleeved condition so that the head may move radially and eccentrically relative to the stub shaft.

An object of the invention is to provide a ball bearing in the bore of the head lying between the conical bearing faces of the head and the stub shaft with the sleeve of the head retaining the ball bearing in position or location.

An object of the invention is to provide a conical seat on the stub shaft and on the head in opposed relation to the internally contained ball bearing with the ball bearing being normally centered on the conical faces and with the radial sleeve bearing of the head in spaced relation radially relative to both the ball and the stub shaft.

An object of the invention is to provide radial space between the ball bearing and the radial sleeve and between the stub shaft and the radial sleeve of the head so that the head may move slightly radially relative to one or to both under the influence of movement of a workpiece with which the head is engaged.

An object of the invention is to provide a live center which may run on axial center or may run on dynamic center as influenced by the workpiece with which it is engaged.

These and other objects of the invention will become apparent by reference to the following description of an axial bearing live center which is capable of radial movement embodying the invention taken in connection with the accompanying drawing in which:

FIG. 1 is a side elevational view of the live center device located between a tail stock of a machine and a clamping portion of a machine such as the head stock with a workpiece positioned between the head stock and the live center.

FIG. 2 is an enlarged exploded side elevational view of the device of the invention, partly in cross section, showing the elements of the invention in more detail.

FIG. 3 is a further enlarged assembly view of the live center device seen in FIGS. 1 and 2, partly in cross section, showing the internal structure and spacing of the parts; and FIG. 4 is a cross sectional view of FIG. 3 showing the space between the sleeve and the ball bearing.

Referring now to the drawing wherein like numerals refer to like and corresponding parts throughout the several views, the live center device disclosed herein to illustrate the invention comprises a stub shaft 10, a head 11, and a ball bearing 13. Stub shaft 10 may have a stem 14 for mounting in the machine so as to provide a shoulder 15 for abutting the machine to absorb axial force and to hold the stub shaft 10 in accurate axial position. The stub shaft face has a conical bearing seat 16 formed by lines at a low angle such as 155°–175° relative to one another so as to describe tangent lines relative to the ball bearing 13 which intersect closely adjacent the axial apex of the ball 13. A ring 17 may be formed by socketing or recessing the bearing face 16 and this provides an extension of radial bearing surface on the stub shaft 10 past the location of the ball 13 in the assembly.

The head 11 has a flat workpiece contacting surface 18 and an internal bore 19 forming a radial bearing sleeve 20. The bore 19 terminates between the outer end surface 18 and the inner end surface 21. The termination of the bore 19 is at an end wall 22 having a conical bearing surface axially disposed in opposition to the bearing surface 16 on the stub shaft 10.

The bearing surface 22 is also formed on lines tangent to the ball bearing 13 which intersect each other at a low angle so as to lie closely adjacent the axial apex of the ball 13.

The diameter of the internal bore 19 is slightly larger than the diameter of the ball 13 and the diameter of the stub shaft 10. It has been found advantageous to have the diameter of the ball 13 and stub shaft 10 substantially the same although one may be slightly larger than the other.

When the device is assembled as shown in FIGS. 1 and 3 there is a slight space radially between the sleeve 20 and the stub shaft 10 and the ball 13. This space is designated S. This space S permits the head 11 to move radially and/or eccentrically relative to the ball 13 and the stub shaft 10. It will be noted however that the sleeve 20 retains the ball 13 in bearing position relative to the bearing surfaces 16 and 22 while still permitting movements of the ball relative to the surfaces. It will also be noted that the aper of the ball at the axis of the center is not contacted by the bearing surfaces but that the bearing surfaces contact the ball at its axial apex closely adjacent thereto. This provides for the ball to move on the surfaces relative to the radial forces exerted so as to eliminate resistance radially for slight distances.

A machine tail stock 30 may have a recess 31 for receiving the stem 14. The shoulder 15 abuts the face of the tail stock 30. This positions and holds the center device in location. A workpiece 32 is placed against the end face 18 of the head 11. The machine drive element, control element, and/or clamp element 33 is then brought against the other side of the workpiece 32 in opposition to the resistance of the live center device as supported by the tail stock 30. The workpiece 32 is therefore clamped or locked in position between the head stock 33 and tail stock 30. Both the tail stock 30 and head stock 33 are integrated in the machine as relatively rigid and unmovable members. Thus if the workpiece 32 were positioned between them, the workpiece 32 would of necessity have to furnish the relative movement absorbing characteristic between such rigidly mounted members. However, with the live center device disposed against the workpiece this aspect of the workpiece is eliminated in that the live center member absorbs any difference in movement between the tail stock 30 and the head stock 33 and allows the workpiece to be completely controlled by the head stock 33 without resistance and/or influence of the rigidity of the tail stock 30.

The live center device of the invention has been very successfully used in grinding machines wherein extremely accurate grinding is required such as on tungsten carbide cutting tools. The workpiece 32 may therefore be such a tool and the member 33 be a clamping device which is angularly moveable to present the workpiece 32 relative to a grinding wheel at desired angles and positions. The member 33 and the tail stock 30 are both integrated on the same plate so that they may be adjusted and moved relative to the grinding wheel as a unit so as to pass the workpiece 32 relative to the grinding wheel. The clamping member 33 may also have various angular positions which are controlled by cams, gears, templates, and other positioning and locating means so as to present the workpiece 32 to grind the desired shape, angles, and reliefs. Thus the live center device provides means for turning the workpiece 32 angularly in that the head 11 may turn on the stub shaft 10.

However the head 11 may also move slightly radially due to the space S between the sleeve 20 and the stub shaft 10 and the ball 13. This movement is facilitated in that the ball 13 is not socketed in either the stub shaft bearing surface or in the head bearing surface thus allowing the ball to roll slightly off axial center to facilitate radial movement and/or eccentric movement of the head with the workpiece 32 relative to the stub shaft 10.

Previous to the use of such a live center in a grinding machine for grinding tungsten carbide tool bits and nibs, it was found that the rigidity of the supporting members caused the workpiece to make the absorption of relative movements so that the workpiece would walk out of accurate position between the holding elements. Thus instead of the rigidity of the holding elements accurately supporting the workpiece, they force the workpiece into the position of absorbing their differences, so that the workpiece walked thereby reducing the accuracy of the grinding operation.

However with the use of the live center device capable of radial and/or eccentric movement it is not necessary for the workpiece 32 to absorb any differences and to walk out of position to accomplish the absorption so that it stays accurately and rigidly controlled by the one member without interference from the other member with the novel live center providing the absorbing medium for any differences.

Although but a single embodiment of the invention has been shown and described in detail, it is obvious that many changes may be made in the size, shape, detail, and arrangement of the various elements of the invention within the scope of the appended claims.

I claim:
1. A live center for exerting axial clamping force against a workpiece and permitting slight radial motion of a workpiece such as eccentric angular movement,
  particularly suitable for mounting in a machine stock and for clamping and holding a workpiece against a machine drive member opposed to said machine stock to provide angular and radial movement comprising;
  a cylindrical head having a workpiece engaging end and an opposite end;
  said opposite end having an internal axial bore leading through said opposite end to a point internally of said head intermediate said ends and terminating in an end wall having a conical face internally of said head at the inner end of said bore;
  said bore defining a sleeve portion on said head having an internal radial bearing wall;
  said end wall conical face being at a low angle so as to define an axial bearing surface on converging intersection lines tangent to a sphere at a large angle to one another such as 155°–175°;
  a ball bearing lying in said sleeve portion of said head in contact with said conical end wall with said conical face of said end wall in contact with said ball bearing closely adjacent but off axial center relative to said ball bearing so as to contact said ball bearing adjacent to but off its axial apex;
  a stub shaft lying in said sleeve portion of said head behind said ball bearing having a like opposed like conical end wall in like contact with said ball bearing;
  and means on said stub shaft for mounting said stub shaft in a machine stock, such as a stem;
  said sleeve bore of said head being somewhat diametrically larger than said ball bearing and said stub shaft so that said head may move slightly radially relative to said stub shaft and relative to said ball;
  said ball providing an eccentrically movable axial bearing between said conical end wall of said head and said conical end wall of said stub shaft;
  said sleeve radially retaining said ball bearing between said conical axial bearing surfaces; and
  said sleeve portion providing a relatively loose radial bearing about said neck so that said head may move slightly eccentrically with a workpiece as controlled by said drive member of said machine to provide for slight radial movement of the workpiece with the machine drive member and to eliminate resistance by the live center member to such movement so that the workpiece is accurately controlled by said machine drive member, without interference of said live center member so that a workpiece does not tend to "walk out" of the control of the drive member because of opposed resistances.

References Cited

UNITED STATES PATENTS

| | | | |
|---|---|---|---|
| 1,155,796 | 10/1915 | Cleveland | 279—16 |
| 1,334,898 | 3/1920 | Gyllsdorff | 279—16 |
| 2,116,135 | 5/1938 | Bath | 51—237 X |

HAROLD D. WHITEHEAD, *Primary Examiner.*

U.S. Cl. X.R.

279—16; 82—38